(12) United States Patent
Rofougaran et al.

(10) Patent No.: US 8,977,219 B2
(45) Date of Patent: Mar. 10, 2015

(54) METHOD AND SYSTEM FOR MITIGATING LEAKAGE OF A 60 GHZ TRANSMITTED SIGNAL BACK INTO AN RF INPUT OF A 60 GHZ DEVICE

(75) Inventors: Ahmadreza Rofougaran, Newport Coast, CA (US); Maryam Rofougaran, Rancho Palo Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 590 days.

(21) Appl. No.: 12/895,520

(22) Filed: Sep. 30, 2010

(65) Prior Publication Data
US 2012/0083215 A1    Apr. 5, 2012

(51) Int. Cl.
H04B 7/06    (2006.01)

(52) U.S. Cl.
CPC .............. H04B 1/525 (2013.01); H04B 7/0691 (2013.01)
USPC .......................................... 455/118; 455/101

(58) Field of Classification Search
USPC .................................... 455/77, 118
See application file for complete search history.

(56) References Cited

U.S. PATENT DOCUMENTS

| | | | | |
|---|---|---|---|---|
| 5,280,472 A * | 1/1994 | Gilhousen et al. | ............ | 370/335 |
| 5,461,646 A * | 10/1995 | Anvari | ............ | 375/347 |
| 5,519,691 A * | 5/1996 | Darcie et al. | ............ | 370/331 |
| 5,533,011 A * | 7/1996 | Dean et al. | ............ | 370/342 |
| 5,781,847 A * | 7/1998 | Clarke et al. | ............ | 455/69 |
| 5,802,173 A * | 9/1998 | Hamilton-Piercy et al. | .. | 379/56.2 |
| 5,805,983 A * | 9/1998 | Naidu et al. | ............ | 455/67.16 |
| 5,901,144 A * | 5/1999 | Maki et al. | ............ | 370/330 |
| 5,969,837 A * | 10/1999 | Farber et al. | ............ | 379/56.2 |
| 6,023,458 A * | 2/2000 | Tweedy et al. | ............ | 370/328 |
| 6,070,063 A * | 5/2000 | Yoshizawa et al. | ........ | 455/234.1 |
| 6,405,018 B1 * | 6/2002 | Reudink et al. | ............ | 455/20 |
| 6,449,477 B1 * | 9/2002 | Weissman | ............ | 455/422.1 |
| 6,801,767 B1 * | 10/2004 | Schwartz et al. | ........... | 455/426.2 |
| 7,426,231 B1 * | 9/2008 | Dorfman | ............ | 375/130 |
| 7,460,082 B2 * | 12/2008 | Li et al. | ............ | 343/893 |
| 7,561,904 B2 * | 7/2009 | Lagnado | ............ | 455/575.7 |
| 7,640,035 B2 * | 12/2009 | Jang et al. | ............ | 455/551 |
| 7,787,854 B2 * | 8/2010 | Conyers et al. | ............ | 455/403 |
| 8,005,050 B2 * | 8/2011 | Scheinert et al. | ............ | 370/335 |
| 8,010,116 B2 * | 8/2011 | Scheinert | ............ | 455/443 |
| 8,159,399 B2 * | 4/2012 | Dorsey et al. | ............ | 343/702 |
| 2001/0046840 A1 * | 11/2001 | Kim | ............ | 455/7 |
| 2003/0045284 A1 * | 3/2003 | Copley et al. | ............ | 455/426 |
| 2003/0087613 A1 * | 5/2003 | Bellaouar et al. | ............ | 455/91 |
| 2004/0051598 A1 * | 3/2004 | Vann et al. | ............ | 332/103 |
| 2006/0253872 A1 * | 11/2006 | Shoji et al. | ............ | 725/62 |
| 2007/0280370 A1 * | 12/2007 | Liu | ............ | 375/267 |

(Continued)

Primary Examiner — Gennadiy Tsvey
(74) Attorney, Agent, or Firm — Oblon, Spivak, McClelland, Maier & Neustadt, L.L.P.

(57) ABSTRACT

Methods and systems for antenna switching for mitigating leakage of a 60 GHz transmitted signal back into an RF input of a 60 GHz device are disclosed and may include configuring one or more antennas in the plurality of remote RF modules based on a measured signal characteristic, wherein the RF modules receive IF signals via coaxial lines. In-phase (I) and quadrature phase (Q) signals may be generated from the received IF signals. The generated I and Q signals may be summed before being transmitted via the antennas. The received IF signals may be up-converted into first I and Q signals, filtered, and up-converted a second time into the generated I and Q signals. Control signals for the RF modules may be communicated utilizing the coaxial lines. A local oscillator frequency may be configured for the up-conversion of signals via the communicated control signals.

12 Claims, 5 Drawing Sheets

(56) References Cited

U.S. PATENT DOCUMENTS

| | | | |
|---|---|---|---|
| 2008/0014948 A1* | 1/2008 | Scheinert .................... 455/444 |
| 2008/0058018 A1* | 3/2008 | Scheinert .................... 455/562.1 |
| 2009/0061940 A1* | 3/2009 | Scheinert et al. ........... 455/562.1 |
| 2009/0258652 A1* | 10/2009 | Lambert et al. .............. 455/446 |
| 2009/0316609 A1* | 12/2009 | Singh ........................... 370/280 |
| 2010/0087227 A1* | 4/2010 | Francos et al. .............. 455/562.1 |
| 2011/0063169 A1* | 3/2011 | Chen et al. ................... 342/368 |
| 2011/0135013 A1* | 6/2011 | Wegener ...................... 375/241 |
| 2011/0141895 A1* | 6/2011 | Zhang .......................... 370/235 |

* cited by examiner

METHOD AND SYSTEM FOR MITIGATING LEAKAGE OF A 60 GHZ TRANSMITTED SIGNAL BACK INTO AN RF INPUT OF A 60 GHZ DEVICE

CROSS-REFERENCE TO RELATED APPLICATIONS/INCORPORATION BY REFERENCE

This application makes reference to:
U.S. patent application Ser. No. 12/895,503 filed on Sep. 30, 2010;
U.S. patent application Ser. No. 12/895,514 filed on Sep. 30, 2010;
U.S. patent application Ser. No. 12/895,528 filed on Sep. 30, 2010;
U.S. patent application Ser. No. 12/895,547 filed on Sep. 30, 2010;
U.S. patent application Ser. No. 12/895,537 filed on Sep. 30, 2010; and
U.S. patent application Ser. No. 12/895,573 filed on Sep. 30, 2010.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for mitigating leakage of a 60 GHz transmitted signal back into an RF input of a 60 GHz device.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence requirements. The communications taking place in this band are often referred to as '60 GHz communications'. With respect to the accessibility of this part of the spectrum, 60 GHz communications may be somewhat similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may possess markedly different communications channel and propagation characteristics, at least due to the fact that 60 GHz radiation is partly absorbed by oxygen in the air, thereby leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for mitigating leakage of a 60 GHz transmitted signal back into an RF input of a 60 GHz device, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
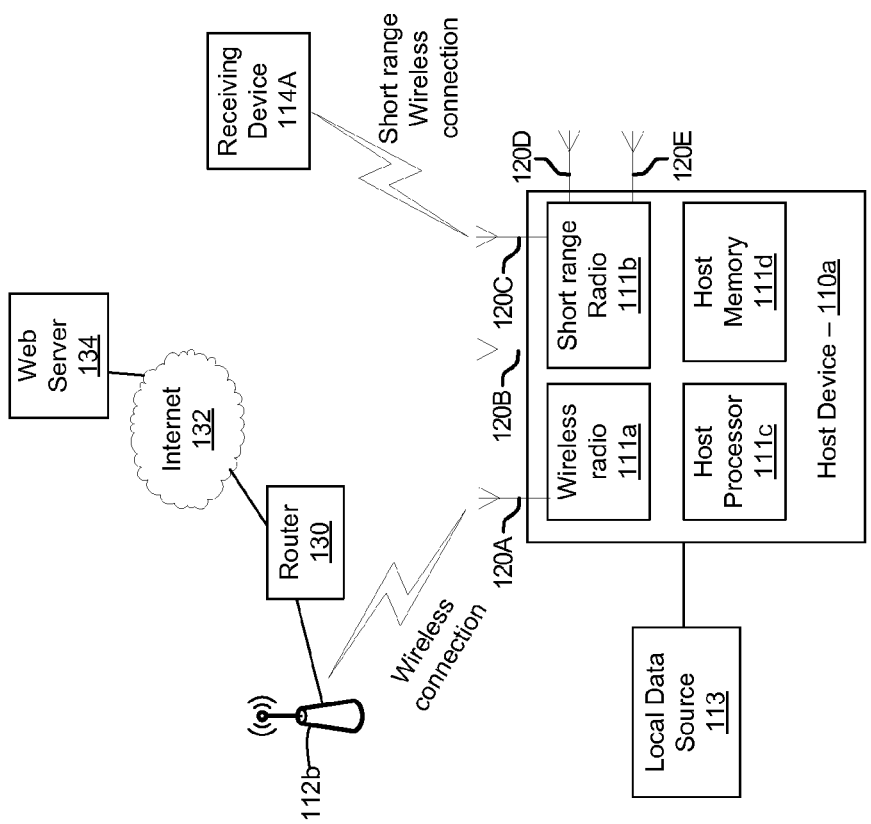
FIG. 1A is a diagram illustrating an exemplary wireless communication system, in accordance with an embodiment of the invention.

Certain aspects of the invention may be found in a method and system for mitigating leakage of a 60 GHz transmitted signal back into an RF input of a 60 GHz device. Exemplary aspects of the invention may comprise configuring one or more antennas in the plurality of remote RF modules based on a measured signal characteristic, wherein each of the plurality of remote RF modules receive IF signals via one or more coaxial lines. In-phase (I) and quadrature phase (Q) signals may be generated from the received IF signals. The generated I and Q signals may be summed before being transmitted via the configured one or more antennas. The received IF signals may be up-converted into first in-phase and quadrature phase signals, filtered, and up-converted a second time into the generated in-phase and quadrature signals. Control signals for the plurality of remote RF modules may be communicated utilizing the one or more coaxial lines. A local oscillator frequency may be configured for the up-conversion of the received IF signals and the up-conversion of the filtered first in-phase and quadrature phase signals via the communicated control signals. The filtering of the first in-phase and quadrature phase signals may be configured utilizing the communicated control signals. The IF signals in the one or more coaxial lines may be tapped at taps coupled to the each of the plurality of remote RF modules. The RF signals may be generated from IF signals from one or more baseband signals. The output RF signals may comprise 60 GHz signals.

FIG. 1 is a diagram illustrating an exemplary wireless communication system, in accordance with an embodiment of the invention. Referring to FIG. 1, there is shown an access point 112b, a host device 110a, a local data source 113, a receiving device 114a, a router 130, the Internet 132 and a web server 134. The host device 110a, or computer, for example, may comprise a wireless radio 111a, a short-range radio 111b, a host processor 111c, a plurality of antennas 120A-120E, and a host memory 111d. There is also shown a wireless connection between the wireless radio 111a and the access point 112b, and a short-range wireless connection between the short-range radio 111b and the receiving device 114a.

The host device 110a may comprise a computer or set-top box device, for example, that may be operable to receive signals from data sources, process the received data, and communicate the processed data to receiving devices. Accordingly, the host device 110a may comprise processors, such as the host processor 111c, storage devices such as the host memory 111d, and communication devices, such as the wireless radio 111a and the short range radio 111b.

The wireless radio 111a may comprise suitable circuitry, logic, interfaces, and/or code that may be operable to communicate wireless signals to between the host device 110a and external devices, such as the access point 112b, for example. Accordingly, the wireless radio 111a may comprise amplifiers, mixers, analog-to-digital and digital-to-analog converters, phase-locked loops, and clock sources, for example, that enable the communication of wireless signals.

The short-range radio 111b may comprise suitable circuitry, logic, interfaces, and/or code that may be operable to communicate wireless signals over short distances. Accordingly, the frequency of transmission/reception may be in the 60 GHz range, which may enable short-range communications due to the attenuation of signals in air at this frequency. Similarly, the short-range radio 111b may comprise amplifiers, mixers, analog-to-digital and digital-to-analog converters, phase-locked loops, and clock sources, for example, that enable the communication of wireless signals.

The host processor 111c may comprise suitable circuitry, logic, interfaces, and/or code that may be operable to received control and/or data information, which may comprise programmable parameters, to determine an operating mode of the wireless radio 111a and the short-range radio 111b. For example, the host processor 111c may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the host memory 111d via the host processor 111c, for example. The information stored in host memory 111d may be transferred to the wireless radio 111a and/or the short-range radio 111b from the host memory 111d via the host processor 111c.

The host memory 111d may comprise suitable circuitry, logic, interfaces, and/or code that may be enabled to store a plurality of control and/or data information, including parameters needed to calculate frequencies and/or gain, and/or the frequency value and/or gain value. The host memory 111d may store at least a portion of the programmable parameters that may be manipulated by the host processor 111c.

The access point 112b may comprise suitable circuitry, logic, interfaces, and/or code that may be enabled to provide wireless signals to one or more devices within its range. The access point 112b may be coupled to the router 130, thereby enabling connection to the Internet for devices that are operable to communicate with the access point 112b.

The local data source 113 may comprise suitable circuitry, logic, interfaces, and/or code that may be enabled to communicate data to the host device 110a. For example, the local data source may comprise a DVD player, and MP3 player, and/or a set-top box.

The receiving device 114A may comprise suitable circuitry, logic, interfaces, and/or code that may be enabled to receive data communicated by the host device 110a via the short-range radio 111b. In an exemplary embodiment of the invention, the receiving device 114A may comprise an HDTV that may be operable to display HD video signals and playback associated audio signals.

The antennas 120A-120E may comprise suitable circuitry, logic, interfaces, and/or code that may be operable to transmit and/or receive wireless signals. For example, the antenna 120A may be operable to transmit and receive wireless signals between the access point 112b and the wireless radio 111a, and the antennas 120B-120E may be operable to communicate signals between the short range radio 111b and one or more external devices, such as the receiving devices 114A.

The router 130 may comprise suitable circuitry, logic, interfaces, and/or code that may be enabled to communicate signals between the access point 112b and the Internet. In this manner, devices within range of the access point 112b may be enabled to connect to the Internet.

The web server 134 may comprise a remote server that may be operable to store content that may be accessed by the host device 110a via the Internet 132. For example, the web server 134 may comprise a movie provider server and may be operable to communicate a desired movie to the host device 110a via the Internet for display via the receiving device 114A.

Frequently, computing and communication devices may comprise hardware and software to communicate using multiple wireless communication standards. The wireless radio 111a may be compliant with a mobile communications standard, for example.

In operation, there may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the host device 110a and the access point 112b. Once this connection is established, the streaming content from the Web server 134 may be received via the router 130, the access point 112b, and the wireless connection, and consumed by the computer or host device 110a.

It may be further desirable for the user of the host device 110a to communicate the streaming content to the receiving device 114A, which may comprise a TV or other type of display, for example. Accordingly, the user of the host device 110a may establish a short-range wireless connection with the receiving device 114A. Once the short-range wireless connection is established, and with suitable configurations on the computer enabled, the streaming content may be displayed by the receiving device 114A. In instances where such advanced communication systems are integrated or located within the host device 110a, the radio frequency (RF) generation may support fast-switching to enable support of multiple communication standards and/or advanced wideband systems like, for example, Ultrawideband (UWB) radio.

Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

In another embodiment of the invention, the local data source 113 may be operable to provide data to be displayed by the receiving device 114A via the host device 110*a*. For example, the local data source may comprise a DVD player or a digital video recorder. The local data source 113 may communicate with the host device 110*a* via a wired connection or via a wireless connection, either directly with the host device 110*a* or via the access point 112*b*.

In an exemplary embodiment of the invention, the short range radio 111*b* may comprise a plurality of antennas and frequency up-conversion devices throughout the host device 110*a* for communicating high frequency RF signals. The short range radio 111*b* may comprise a baseband and IF stage with a single high power PA that may communicate IF signals over thin coaxial lines. Taps may be configured to couple the IF signals from the coaxial lines to the frequency up-conversion devices before being communicated to the plurality of antennas. In this manner, IF signals may be amplified by a single PA and subsequently up-converted to 60 GHz, for example, for transmission via a plurality of antennas without the need for multiple PAs with excessive power requirements.

By utilizing in-phase and quadrature paths in one or more remote RF modules that receive IF signals via coaxial lines in the host device 110*a*, the leakage of transmitted RF signals back to the RF module input may mitigated. Accordingly, the IF signals communicated to the remote RF modules may be up-converted utilizing mixers with LO signals out-of-phase by 90 degrees from each other, filtered, and up-converted to the desired RF frequency, 60 GHz, for example. The I and Q RF signals may then be summed before being transmitted by one or more of the antennas 120B-120E.

Figure 1B:
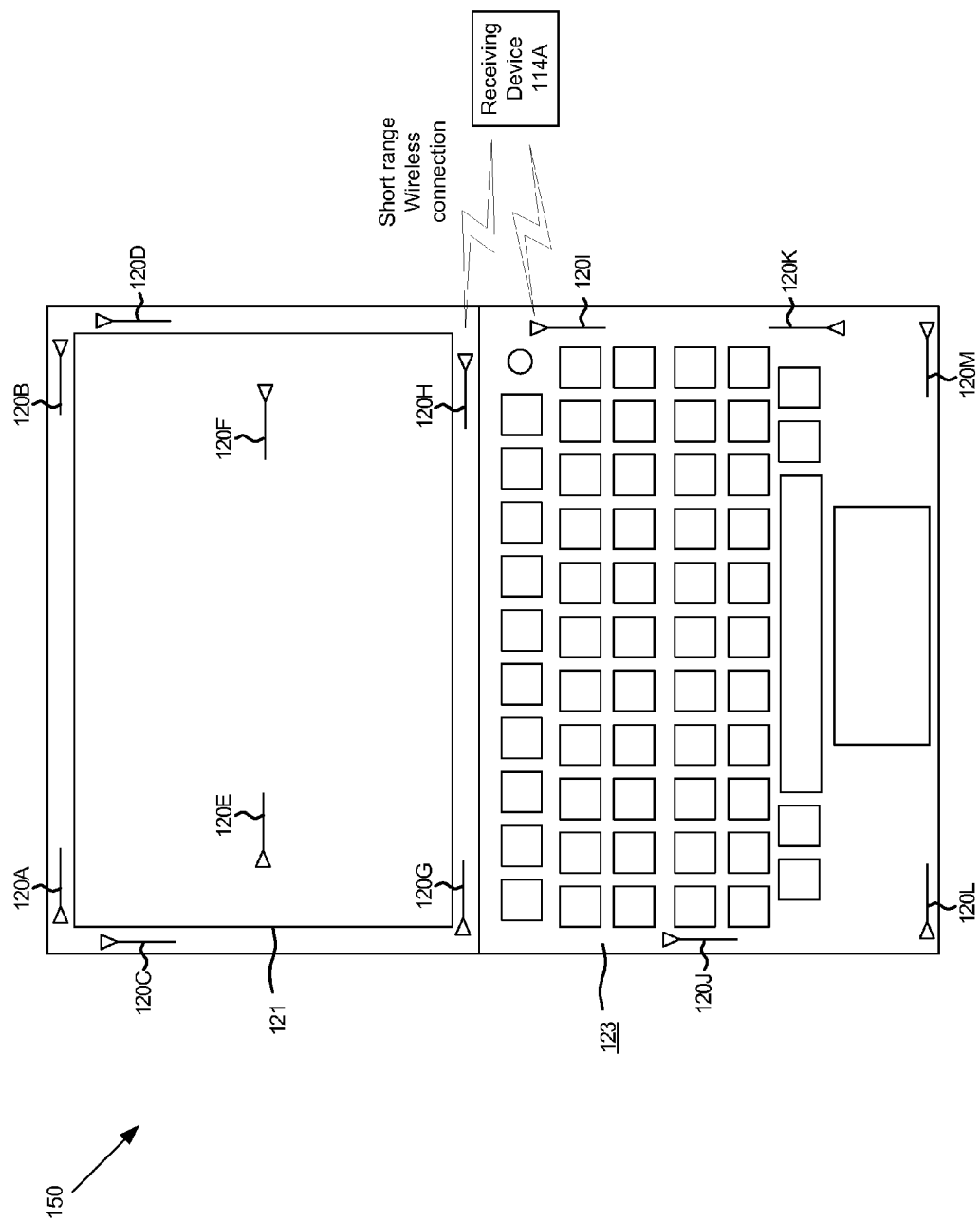
FIG. 1B is a block diagram illustrating a laptop computer with an exemplary 60 GHz distributed communication system, in accordance with an embodiment of the invention.

FIG. 1B is a block diagram illustrating a laptop computer with an exemplary 60 GHz distributed communication system, in accordance with an embodiment of the invention. Referring to FIG. 1B, there is shown a laptop computer comprising a display 121, keyboard 123, and a plurality of antennas 120A-120M.

The antennas 120A-120M may be substantially similar to the antennas 120A-120E described with respect to FIG. 1A, and may comprise antennas coupled to a plurality of remote RF modules throughout the laptop 150. In this manner, one or more antenna configurations may be enabled, depending on the location of the receiving device, such as the receiving device 114A, and the antenna configuration that results in the greatest signal strength, lowest bit error rate, highest data throughput, lowest latency, and/or the optimum of any other desired wireless communication characteristic. The configuration found to have the desired characteristics may be utilized to transmit RF signals by communicating an IF signal to each of the RF modules driving the antennas 120A-120M in that configuration. Exemplary characteristics may comprise carrier to noise ratio (CNR), carrier to interference noise ratio (CINR), signal to noise ratio (SNR), signal to interference noise ratio (SINR), throughput, bit error rate (BER), packet error rate (PER), frame error rate (FER), quality of service (QoS), latency, and/or signal strength.

The antennas 120A-120M may be coupled to remote RF modules throughout the laptop 150. The remote RF modules may receive IF signals from a baseband and IF module via thin coaxial lines, described with respect to FIG. 2, and may be operable to up-convert received IF signals to RF signals. In this manner, lower frequency signals may be communicated throughout the laptop 150 to the antennas that result in desired signal quality. This may enable a single high-power PA stage that amplifies the IF signals that are then up-converted to RF in the remote RF modules.

In operation, a short-range wireless communication channel may be enabled between the laptop 150 and the receiving device 114A. A plurality of antenna configurations may be assessed for a desired performance characteristic, such as signal strength, bit error rate, data throughput, and/or latency, for example. The remote Include configuration with the resulting desired performance may then be enabled to receive IF signals via coaxial lines from a centrally located baseband and IF module, and up-convert the signals to RF before transmitting via the appropriate antennas 120A-120M. In this manner, short-range communications may be enabled to one or more devices independent of its location in proximity with the laptop 150.

Furthermore, leakage of the transmitted RF signals back to the inputs of the remote RF modules may be mitigated by communicating IF signals to the RF modules and up-converting them in a two-stage in-phase and quadrature paths.

Figure 2:
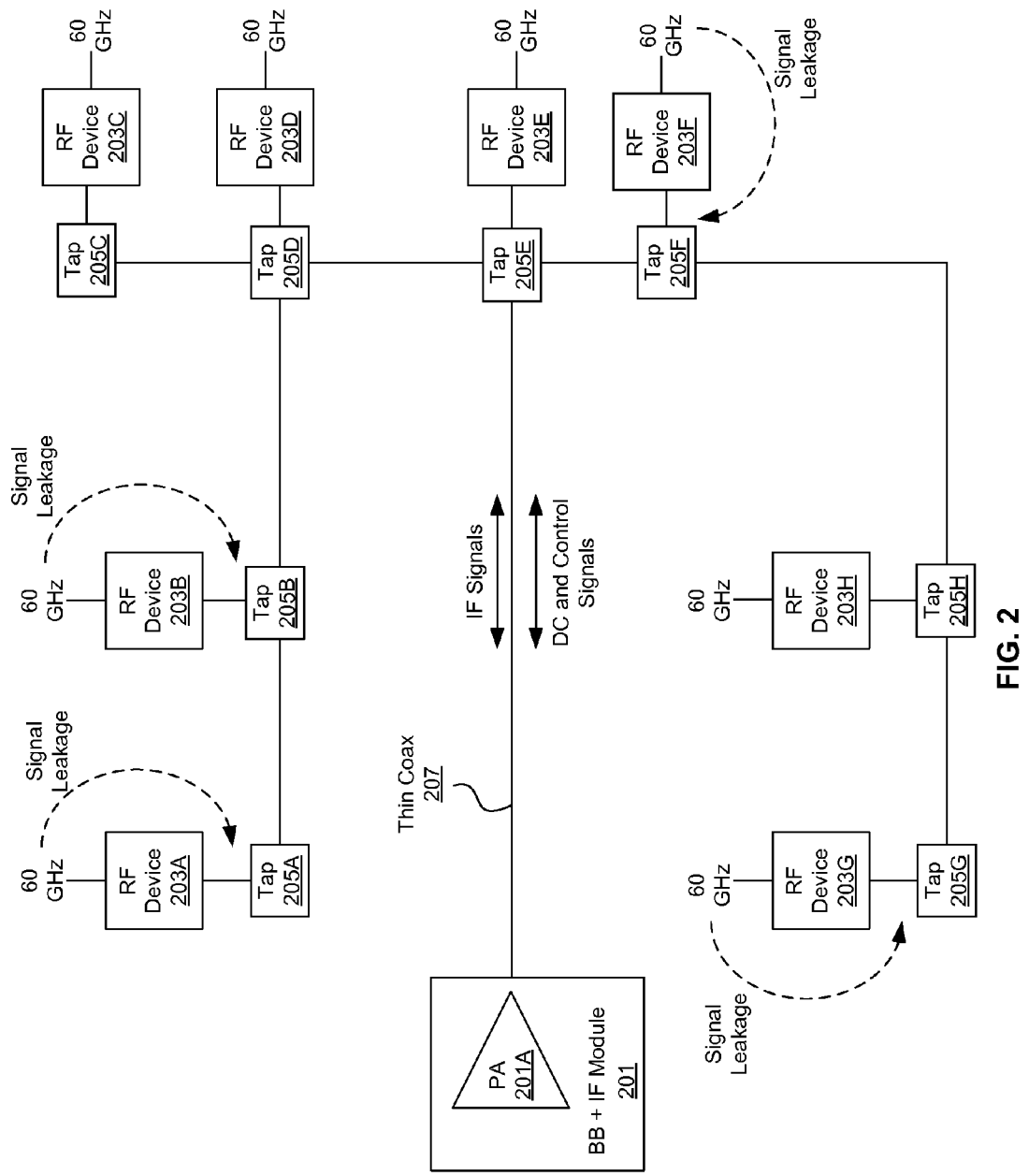
FIG. 2 is a block diagram illustrating an exemplary 60 GHz communication system, in accordance with an embodiment of the invention.

FIG. 2 is a block diagram illustrating a 60 GHz communication system, in accordance with an embodiment of the invention. Referring to FIG. 2, there is shown a baseband and IF module 201, RF modules 203A-203H, taps 205A-205H, and thin coaxial line 207.

The baseband and IF module 201 may comprise suitable circuitry, logic, interfaces, and/or code that may be operable to generate IF signals comprising baseband data. The baseband and IF module 201 may comprise one or more processors, such as a baseband processor, memory, and frequency conversion devices, for example. The processor or processors in the baseband and IF module 201 may be any suitable processor or controller such as a CPU, DSP, ARM, or any type of integrated circuit processor, and may be enabled to update and/or modify programmable parameters and/or values in a plurality of components, devices, and/or processing elements in the baseband and IF module 201. At least a portion of the programmable parameters may be stored in memory, such as the host memory 111*d*, for example, or dedicated memory in the baseband and IF module 201.

The RF modules 203A-203H may comprise suitable circuitry, logic, interfaces, and/or code that may be operable to convert received IF signals to RF frequencies and transmit the RF signals via one or more antennas. The RF modules 203A-203H may be configured remotely throughout a wireless communication device, such as the host device 110*a*, described with respect to FIG. 1, so that 60 GHz signals may be communicated from a plurality of directions, depending on the location of a device that is the intended receiving device. By incorporating frequency up-conversion capability in the RF modules 203A-203H, IF signals may be communicated from a single high power PA in the baseband and IF module 201 via the thin coaxial line 207.

The taps 205A-205H may comprise suitable circuitry, logic, interfaces, and/or code that may be operable to couple a portion of the IF signal being communicated via the thin coaxial line 207 to the associated RF modules 203A-203H. In this manner, taps may be configured to couple signals when it may be desired to transmit RF signals via one or more of the RF modules 203A-203H.

The thin coaxial line 207 may comprise coaxial conductors separated by a dielectric material, for example, and may be operable to communicate IF signals throughout a device, such as the host device 110*a*. In another embodiment of the invention, the thin coaxial line 207 may be operable to provide DC power for various devices within the host device 110a, such as the RF modules 203A-203H.

In operation, the baseband and IF module 201 may process baseband signals for transmission via the RF modules 203A-203H. The baseband signals may be up-converted to IF and amplified by a PA prior to communication via the thin coaxial line 207, which may distribute the IF signals throughout the device, such as the host device 110a, for example. One or more of the taps 205A-205H may be enabled to tap a portion of the communicated IF signals to associated RF modules 203A-203H. The RF modules 203A-203H may up-convert the tapped IF signals to RF frequencies, such as 60 GHz, for example, before transmission via one or more antennas in the RF modules 203A-203H. In this manner, an RF power amplifier is not required at each RF module 203A-203H, which would require more power than by utilizing a single PA at the IF stage in the baseband and IF module 201.

In addition to IF signals to be up-converted and transmitted, the thin coaxial line 207 may communicate low frequency control signals to the RF modules 203A-203H and the taps 205A-205H. The control signals may be utilized to configure which of the taps 205A-205H may be activated to tap off part of the IF signals for transmission by the appropriate RF modules 202A-203H. In addition, the control signals may be utilized to configure the up-conversion performed in the RF modules 203A-203H. In this manner, only those RF modules 203A-203H that have antennas in an appropriate direction for a desired receiving device may be activated, further reducing power requirements.

In an exemplary embodiment of the invention, the RF modules 203A-203H may be enabled individually to determine an RSSI for communication between the host device 110a and a remote device, such as the receiving device 114A. One or more antennas in the RF modules 203A-203H may be enabled sequentially, or in any desired order, to determine an antenna configuration that results in the maximum received signal strength, for example. Other signal characteristics that may be utilized to configure the RF modules and antennas may comprise CNR, CINR, SNR, SINR, throughput, BER, PER, FER, QoS, and/or latency.

The configuration parameters may be communicated utilizing control channels communicated over the thin coaxial line 207, and the measured signal parameters may be communicated back to the baseband and IF module 201 via the same coaxial line. The control channels may reside at different frequencies than the IF signals to enable multi-signal communication over the thin coaxial line 207.

The optimum configuration may be assessed periodically to determine if one or more other RF modules may be capable of communicating signals with better integrity. The RF modules 205A-205H and associated antennas may be configured by control signals communicated over the thin coaxial line 207. The control signals may be at a different frequency than the IF signals communicated via the RF modules 203A-203F.

In an exemplary embodiment of the invention, leakage of transmitted RF signals to inputs of one or more of the RF modules 203A-203H may be mitigated by communicating IF signals via coaxial lines and implementing the I and Q mixer paths. The inputs of the RF modules 203A-203H may be tuned to receive IF signals, and any RF signals that may be received by the RF modules 203A-203H may be upconverted into I and Q signals, thereby greatly reducing any communication of leaked RF signals through the paths in the RF modules 203A-203H.

Figure 3:
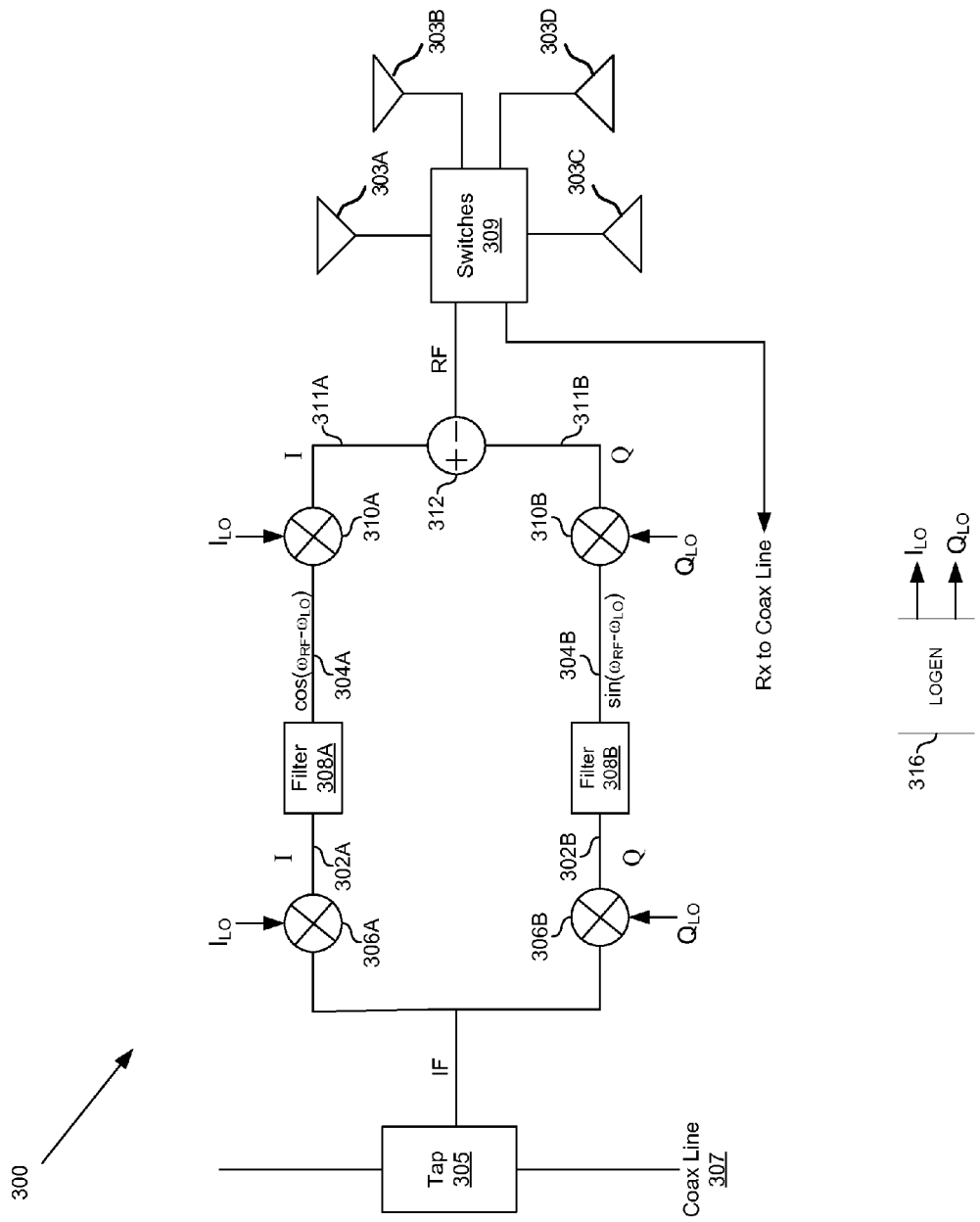
FIG. 3 is a block diagram illustrating an exemplary RF I and Q path device, in accordance with an embodiment of the invention.

FIG. 3 is a block diagram illustrating an exemplary RF I and Q path device, in accordance with an embodiment of the invention. Referring to FIG. 3, there is shown a tap 305, a coaxial line 307 and an RF module 300 comprising antennas 303A-303B mixers 306A, 306B, 310A, and 310B, filters 308A and 308B, a switch array 309, an adder 312, and a local oscillator generator (LOGEN) 316.

The antennas 303A-303D may comprise antennas operable to transmit and/or receive RF signals, and may be configured with different orientations, for example. The tap 305 and the coaxial line 307 may be substantially similar to the taps 205A-205H and the coaxial line 207 described with respect to FIG. 2.

The mixers 306A and 306B may each comprise suitable circuitry, logic, interfaces, and/or code that may enable generation of inter-modulation products resulting from mixing the received signal IF with in-phase LO signal $I_{LO}$ and the quadrature-phase LO signal $Q_{LO}$, respectively. Similarly, the mixers 310A and 310B may each comprise suitable circuitry, logic, interfaces, and/or code that may enable generation of inter-modulation products resulting from mixing the filter outputs 304A and 304B with $I_{LO}$ and $Q_{LO}$, respectively. The mixers 306A, 306B, 310A, and 310B may therefore be operable to up-convert an IF signal to two RF signals 311A and 311B.

The filters 308A and 308B may each comprise suitable circuitry, logic, interfaces, and/or code that may enable passing frequencies at or near a desired frequency and attenuating other frequencies. In this regard, the desired frequency may be given by $f_{IF}+f_{LO}$, where $f_{IF}$ may be the frequency of the signal received via the coaxial line 307 and $f_{LO}$ may be the frequency of the local oscillator signal output by the LOGEN 316. In various embodiments of the invention, the bandwidth, attenuation, and/or center frequency of each of the filters 308A and 308B may be adjustable based on one or more control signals. Accordingly, the filters 308A and 308B may each receive one or more control signals from a processor such as the host processor 111c, described with respect to FIG. 1A.

The switch array 309 may comprise suitable circuitry, logic, interfaces, and/or code that may be operable to selectively couple the RF signal generated by the mixer 312 to one or more of the antennas 303A-303D. The switch array 309 may be operable to couple a received RF signal to the coaxial line via a down-conversion mixer, for example. In an exemplary embodiment of the invention, the antenna array 309 may comprise an array of CMOS switches that may be enabled based on a desired RF signal characteristic when receiving signals via the selected antennas. In this manner, an antenna configuration may be selected based on CNR, CINR, SNR, SINR, throughput, BER, PER, FER, QoS, latency, and/or signal strength.

The adder 312 may comprise circuitry, logic, interfaces, and/or code for combining the signals 311A and 311B to generate an RF signal. In this regard, the adder 312 may be enabled to add signal 311A to signal 311B, subtract signal 311A from signal 311B, and/or subtract signal 311B from signal 311A. In this regard, the adder 312 may receive one or more control signals to determine whether addition or subtraction may be performed. Furthermore, the selection of addition or subtraction may depend on the phasing and/or polarity of the signals $I_{LO}$, $Q_{LO}$, 304A, and 304B. For example, $I_{LO}$ may be $\cos(\omega_{LO}t)$ and $Q_{LO}$ may be $\sin(\omega_{LO}t)$ and addition may be selected such that the output of the adder 312 may be $\cos(\omega_{IF}t-\omega_{LO}t)$, where $\omega_{IF}=\omega_{RFin}-\omega_{LO}$. Alternatively, $I_{LO}$ may be $\cos(\omega_{LO}t)$ and $Q_{LO}$ may be $-\sin(\omega_{LO}t)$ and subtraction may be selected such that the output of the adder 312 may be $\cos(\omega_{IF}t-\omega_{LO}t)$, where $\omega_{IF}=\omega_{RFin}-\omega_{LO}$.

The LOGEN 316 may comprise suitable circuitry, logic, interfaces, and/or code that may enable generating reference signals $I_{LO}$ and $Q_{LO}$. In various embodiments of the invention, the signal generator 316 may comprise, for example, one or more VCO's, PLLs, and/or direct digital frequency synthesizers (DDFSs). The frequency of the LO signals output by the LOGEN 316 may be determined based on one or more control signals from a processor, such as the host processor 111c, described with respect to FIG. 1A.

In operation, an IF signal may be received from the coaxial line 307 via the antenna tap 305. Control signals in the coaxial line 307 may configure the tap 305 to tap off a portion of an IF signal communicated via the coaxial line 307 and communicate it to the mixers 306A and 306B. The mixers 306A and 306B may mix the IF input signal with the LO signals $I_{LO}$ and $Q_{LO}$. In this regard, a processor, such as the processor 111c described with respect to FIG. 1C, may provide one or more signals for controlling the frequency of the LO signals output by the LOGEN 316.

The filters 308A and 308B may filter the output of mixers 306A and 306B to generate second intermediate frequency signals 304A and 304B. In this regard, the processor 111c may provide one or more signals for controlling the response of the filters 308A and 308B. The mixers 310A and 310B may mix the signals 304A and 304B with the LO signals to generate the RF I and Q signals 311A and 311B. The adder 312 may add or subtract the signals 311A and 311B to generate the signal RF. In this manner, RF signals may be generated by frequency shifting IF by $2*f_{LO}$, where $f_{LO}$ is the frequency of the LO signal output by the LOGEN 316.

The filtered RF signal may then be communicated to one or more of the antennas 303A-303D via the switch array 309. Additionally, the LO signal may be utilized to up-convert the IF signal to RF frequencies, and the high-pass filter may filter out all but the desired signal at a frequency above a configurable corner frequency of the high-pass filter. The control signals may also configure the frequency of the LO signal, thereby configuring the frequency of the RF signal to be communicated.

By communicating IF signals via coaxial lines, and implementing the I and Q mixer paths, RF signal leakage of a transmitted signal back to the input of the RF modules may be mitigated. The inputs of the RF module 300 may be tuned to receive IF signals, and any RF signals that may be received by the mixers 306A and 306B may be upconverted and filtered by the filters 308A and 308B, thereby greatly reducing any communication of leaked RF signals through the I and Q paths. In addition, a two-step up-conversion process may enable a lower frequency LO signal, and may also enable the configuration of signals in the I and Q paths that are not susceptible to harmonics of the transmitted RF signals.

Figure 4:
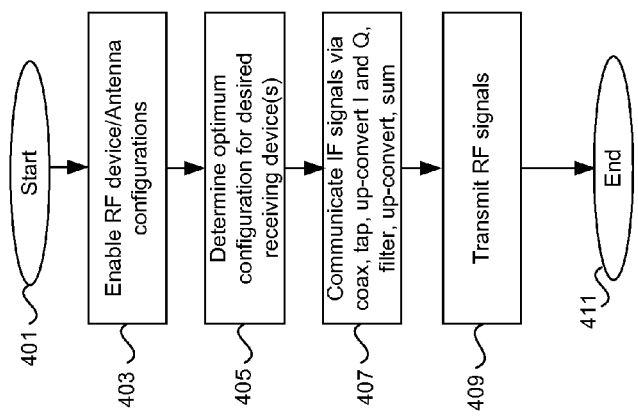
FIG. 4 is a block diagram illustrating exemplary steps for mitigating leakage of a 60 GHz transmitted signal back into an RF input of a 60 GHz device, in accordance with an embodiment of the invention.

FIG. 4 is a block diagram illustrating exemplary steps for mitigating leakage of a 60 GHz transmitted signal back into an RF input of a 60 GHz device, in accordance with an embodiment of the invention. Referring to FIG. 4, after start step 401, in step 403, RF modules may be enabled. In step 405, the optimum configuration or configurations may be determined for the desired receiving device or devices, based on characteristics such as CNR, CINR, SNR, SINR, throughput, BER, PER, FER, QoS, latency, and/or signal strength, for example. In step 407, baseband signals may be up-converted to IF before being communicated to the optimum RF modules or devices via coaxial lines. The signals may be tapped by taps in the RF modules, up-converted to I and Q signals, filtered, up-converted, and summed, resulting in an RF signal for transmission. In step 409, the RF signals may be transmitted by one or more antennas in the RF modules. In another embodiment of the invention, the RF modules may time division duplex transmitted signals and received signals, alternating between transmitting and receiving signals, followed by end step 411.

In an embodiment of the invention, a method and system may comprise configuring one or more antennas in a plurality of remote RF modules 203A-203H, 300 in a wireless communication device 110a, 150, based on a measured signal characteristic, wherein each of the plurality of remote RF modules 203A-203H, 300 receive IF signals via one or more coaxial lines 207 and 307. The received IF signals may be up-converted into in-phase (I) and quadrature phase (Q) signals, filtered, up-converted a second time, summed, and transmitted via the configured one or more antennas 120A-120M, 303A-303D. The IF signals may be tapped in the one or more coaxial lines 207 and 307 at taps 205A-205H, 305 coupled to the one or more remote RF modules 203A-203H, 300. The RF signals may be generated from IF signals from one or more baseband signals. The one or more antennas 120A-120M, 303A-303D may be configured utilizing a switch array 309. The baseband signals may comprise one or more of video data, streamed Internet data, or data from a local data source. The summed up-converted I and Q signals may be transmitted to a receiving device 114A. Control signals for the plurality of remote RF modules 203A-203H, 300 may be communicated utilizing the one or more coaxial lines and may be utilized to configure a local oscillator 316 frequency for the up-conversion and/or for configuring the filtering of the I and Q signals. The output RF signals may comprise 60 GHz signals.

In an embodiment of the invention, a method and system may comprise configuring one or more antennas 120A-120M, 303A-303D in the plurality of remote RF modules 203A-203H in a wireless communication device 110a, 150, 300 based on a measured signal characteristic, wherein each of the plurality of remote RF modules 203A-203H, 300 receive IF signals via one or more coaxial lines 207 and 307. In-phase (I) and quadrature phase (Q) signals may be generated from the received IF signals. The generated I and Q signals may be summed before being transmitted via the configured one or more antennas 120A-120M, 303A-303D. The received IF signals may be up-converted into first in-phase and quadrature phase signals, filtered, and up-converted a second time into the generated in-phase and quadrature signals. Control signals for the plurality of remote RF modules 203A-203H, 300 may be communicated utilizing the one or more coaxial lines 207 and 307. A local oscillator 316 frequency may be configured for the up-conversion of the received IF signals and the up-conversion of the filtered first in-phase and quadrature phase signals via the communicated control signals. The filtering of the first in-phase and quadrature phase signals may be configured utilizing the communicated control signals. The IF signals in the one or more coaxial lines 207 and 307 may be tapped at taps 205A-205H, 305 coupled to the each of the plurality of remote RF modules 203A-203H, 300. The RF signals may be generated from IF signals from one or more baseband signals. The output RF signals may comprise 60 GHz signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for mitigating leakage of a 60 GHz transmitted signal back into an RF input of a 60 GHz device.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, comprising:
    selecting a subset of a plurality of antennas in a plurality of remote RF modules included in a wireless communication device based on a measured signal characteristic, each of said plurality of remote RF modules receiving IF signals via one or more coaxial lines, said IF signals being amplified analog IF signals that were amplified by a power amplifier in a final amplification stage;
    communicating control signals for said plurality of remote RF modules using the one or more coaxial lines;
    generating first in-phase and quadrature phase signals by directly upconverting said received IF signals;
    filtering said first in-phase and quadrature phase signals;
    upconverting said filtered first in-phase and quadrature phase signals into RF in-phase and quadrature signals;
    summing said RF in-phase and quadrature signals; and
    transmitting said summed RF in-phase and quadrature signals via said selected one or more antennas without using another power amplifier.

2. The method according to claim 1, comprising configuring a local oscillator frequency for said up-conversion of said received IF signals and said up-conversion of said filtered first in-phase and quadrature phase signals via said communicated control signals.

3. The method according to claim 1, comprising configuring said filtering of said first in-phase and quadrature phase signals utilizing said communicated control signals.

4. The method according to claim 1, comprising tapping said IF signals in said one or more coaxial lines at taps coupled to said each of said plurality of remote RF modules.

5. The method according to claim 1, comprising generating RF signals from IF signals from one or more baseband signals.

6. The method according to claim 5, wherein said RF signals comprise 60 GHz the signals.

7. A system for wireless communication, comprising:
    one or more circuits in a wireless communication device, said one or more circuits being configured to:
    select a subset of a plurality of antennas in a plurality of remote RF modules based on a measured signal characteristic, each of said plurality of remote RF modules receives IF signals via one or more coaxial lines, said IF signals being amplified analog IF signals that were amplified by a power amplifier in a final amplification stage;
    communicate control signals for said plurality of remote RF modules using the one or more coaxial lines;
    generate first in-phase and quadrature phase signals by directly upconverting said received IF signals;
    filter said first in-phase and quadrature phase signals;
    upconvert said filtered first in-phase and quadrature phase signals into RF in-phase and quadrature signals;
    sum said RF in-phase and quadrature signals; and
    transmit said summed RF in-phase and quadrature signals via said selected one or more antennas without using another power amplifier.

8. The system according to claim 7, wherein said one or more circuits are operable to configure a local oscillator frequency for said up-conversion of said received IF signals and said up-conversion of said filtered first in-phase and quadrature phase signals via said communicated control signals.

9. The system according to claim 7, wherein said one or more circuits are operable to configure said filtering of said first in-phase and quadrature phase signals utilizing said communicated control signals.

10. The system according to claim 7, wherein said one or more circuits are operable to tap said IF signals in said one or more coaxial lines at taps coupled to said each of said plurality of remote RF modules.

11. The system according to claim 7, wherein said one or more circuits are operable to generate RF signals from IF signals from one or more baseband signals.

12. The system according to claim 11, wherein said RF signals comprise 60 GHZ the signals.

* * * * *